Sept. 21, 1926.  M. KIZYMA  1,600,890
CONDUIT OUTLET BOX
Filed April 15, 1924   2 Sheets-Sheet 1
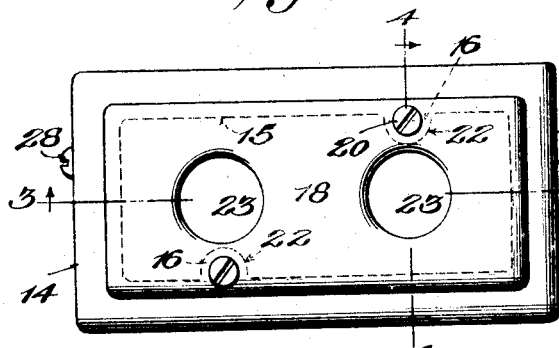
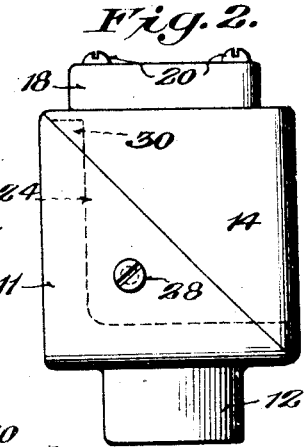
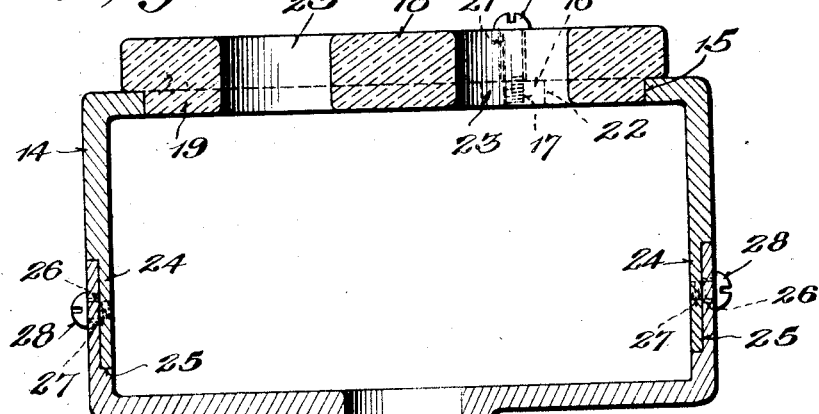
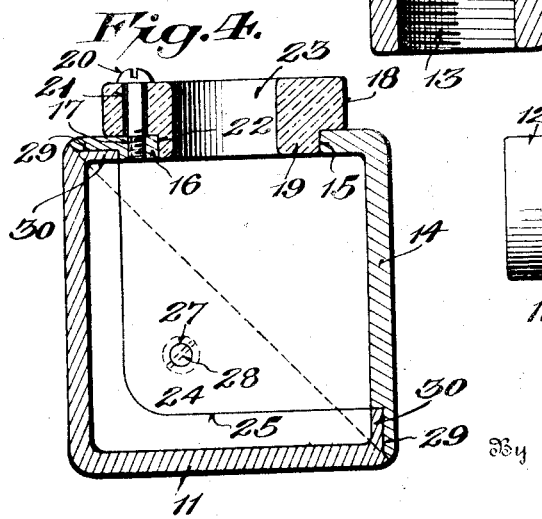
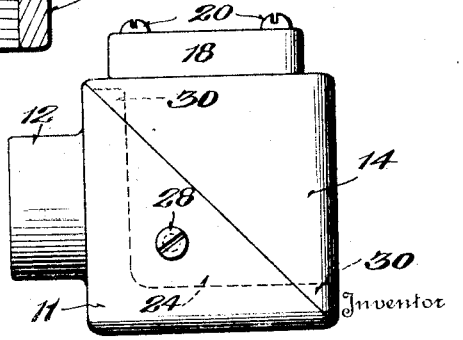
M. Kizyma,
Inventor
By Ţ. Pelechowicz
Attorney Sept. 21, 1926.  
M. KIZYMA  
CONDUIT OUTLET BOX  
Filed April 15, 1924  
1,600,890  
2 Sheets-Sheet 2

Inventor  
M. Kizyma,  
By R. Pelechowicz  
Attorney

Patented Sept. 21, 1926.

1,600,890

UNITED STATES PATENT OFFICE.

MICHAEL KIZYMA, OF TRENTON, NEW JERSEY.

CONDUIT OUTLET BOX.

Application filed April 15, 1924. Serial No. 706,685.

This invention relates to improvements in conduit outlet boxes, and its main object is the provision of the box of a reversible type whereby the conduit wires may be led from the conduit pipe in an upright or horizontal direction, depending upon the location of the opening in the conduit pipe.

A further object of the invention is to facilitate the extension of the conduit wires from the conduit pipe by preventing injury to the insulation of the wires during the process of extension.

A still further object of the invention is the provision of a box made in two sections with cooperating means between the sections to hold the sections firmly in position and prevent any extraneous objects such as water, dirt or dust entering the box.

A still further object of the invention is the provision of a box made of two sections, wherein one section may remain stationary and the other may be adjusted to different positions in respect to said stationary section.

With these objects in view and others that will appear as the invention is better understood, the same consists in the novel construction, combination and arrangement of parts hereinafter more fully described, illustrated in the accompanying drawings and pointed out in the appended claims.

In the drawings forming part of this application, and in which like designating characters refer to corresponding parts throughout the several views, Figure 1 is a top plan view of the assembled box;

Figure 2 is a side or end elevational view of the assembled box;

Figure 3 is a longitudinal sectional view of the assembled box taken on line 3—3 of Figure 1;

Figure 4 is a cross sectional view taken on line 4—4 of Figure 1;

Figure 5 is a side elevational view of the box wherein one section of the box remains in a reversed position in respect to the other section;

Figure 6:
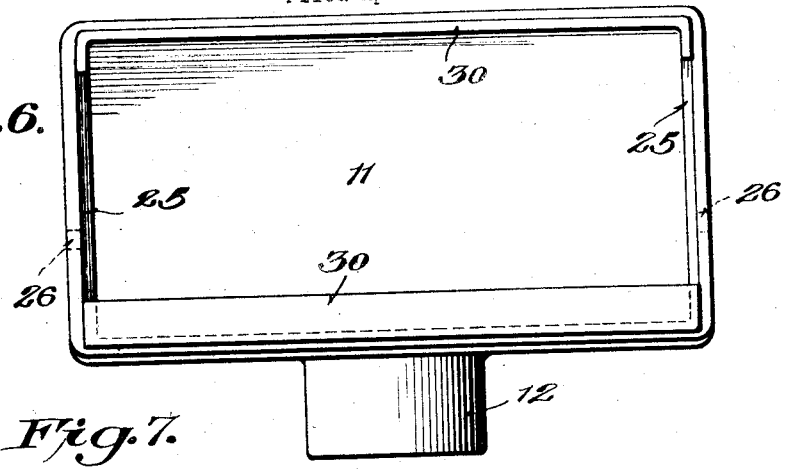
Figure 6 is a side plan view of the lower section of the box looking towards the inside of the section.

Describing the invention in detail same embodies a lower section 11 with a pipe connection 12 depending from one of the sides of said lower section. The pipe connection 12 is threaded as at 13 for adjusting said lower section to a conduit pipe. The upper section 14 has an opening 15 of substantially rectangular shape formed in one of its sides. A lug 16 projects on one pair of the opposite sides of said opening. Each lug 16 has a threaded aperture 17, a porcelain block 18 with its reduced portion 19 is positioned within said opening 15 and secured to said lugs 16 by means of screws 20 which pass through the aperture 21 in said porcelain block, said apertures being in alinement with the apertures 17 in the lugs 16.

As is plainly seen from Figures 1 and 3 the reduced portion 19 of the porcelain block 18 is provided with grooves 22 corresponding in shape to lugs 16 wherein said lugs are received.

The porcelain block 18 is further provided with a pair of openings 23 through which the conduit wires are led.

It is observed that the bottom face of the porcelain block remains flush with one side of the upper section to which it is secured.

Figure 7:
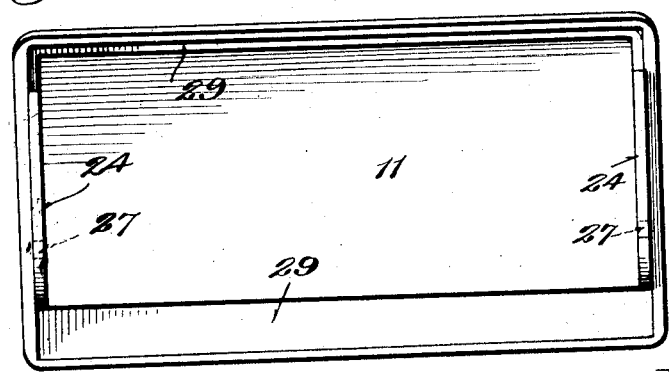
Figure 7 is a side plan view of the upper section of the box looking towards the inside of the section.

The upper section 14 of the box is provided with integrally formed lugs 24 depending from the opposite sides of said section. As is clearly seen from Figures 3 and 7 said lugs 24 are reduced in thickness on their outer sides so that they may fit in the cut away portions 25 made in the corresponding sides of the lower section 11. Said sides are provided with apertures 26 which come in alinement with the threaded apertures 27 when the two sections are in the operative assembled formation. Screws 28 hold the two sections in position.

The upper section is further provided with the reduced edges 29 for the purpose of receiving the reduced edges or flanges 30 of the lower section. It will therefore be seen that the cut away portions 25, lugs 24, reduced edges 29 of the upper section, and reduced edges or flanges 30 of the lower section will form interlocking means between the two sections. The box in the assembled formation will form smooth and even surfaces both inside and outside as the above mentioned cooperating parts forming the interlocking means will lie flush with the plane of the walls of the box. This arrangement may be clearly seen from Figures 3 and 4.

It is observed that the hereinbefore described box has this advantage that the position of the upper section of the box may be reversed in respect to the lower section or vice versa as may plainly be seen from Figures 2 and 5.

Coming to the mode of operation of the device, let us suppose the box is to be adjusted upon the upper part of the periphery of the conduit pipe. In such case the threaded sleeve 12 is placed upon the corresponding fitting in the conduit pipe and the lower section of the box will remain in position shown in Figure 2. The conduit wires are then led through the opening of the sleeve 12, each wire is passed through openings 23 in the porcelain block 18 and the upper section 14 is secured to the lower section. Figure 2 illustrates the two sections in a position permitting the conduit wires to be led in an upright direction through the box.

The interlocking means between the two sections, as already explained, permit the reversal of position of the upper section in respect to the lower section. It is therefore readily apparent that the position of the upper section may be reversed in which case the sleeve 12 and opening 15 would assume an angular juxtaposition. In this latter case, assuming of course that the lower section remains in the position shown in Figure 2, the side block 18 of the upper section will be laterally positioned. In this case, viewing Figure 2, the side with block 18 would remain on the right hand side.

In that assumed case the conduit wires will be led through the opening in the fitting and sleeve 12, and when proper length of the wires has been pulled from the conduit pipe, the wires will be bent, and upon having been passed through the openings 23 the two sections are locked and thus a portion of the wires bent at a right angle will remain within the box. The object of leading wires laterally will have been accomplished.

Figure 5 illustrates the adaptation of the device in case the opening in the conduit pipe is on the side of the pipe and the wires bent in the box at an angle are led in an upright direction from the box. Reversal of the position of the upper section will permit the wires to be led laterally as is obvious.

Figures 8, 9:
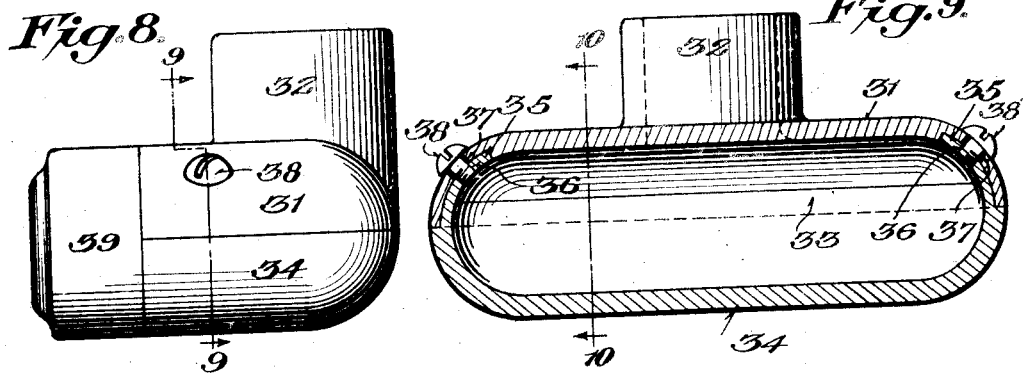
Figure 8 is a side elevational view of a modified form of the box.
Figure 9 is a longitudinal cross sectional view of the box taken on line 9—9 of Figure 8.
Figure 10:
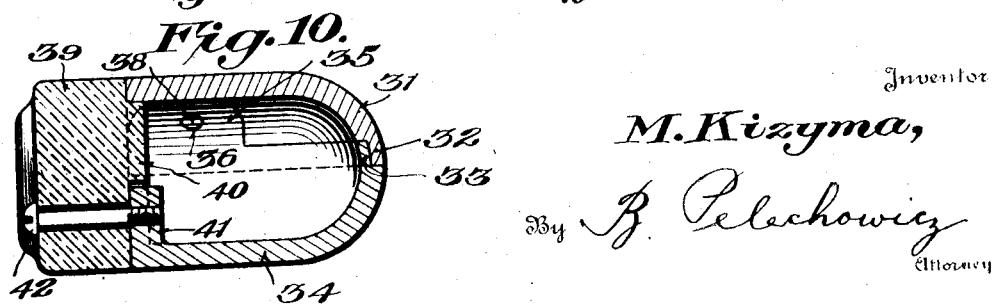
Figure 10 is a cross sectional view of the box taken on line 10—10 of Figure 9.

The modified form of the invention, illustrated on Figures 8 to 10 inclusive, embodies a lower section 31 with an inwardly threaded sleeve integrally formed with, and projecting from said section. Edges 32 are reduced in thickness to interlock with the reduced edges 33 of the upper section 34. At the opposite sides of the upper section said edges are enlarged into lugs or webs 35 and are provided with threaded apertures 36. Cut away portions are provided in the lower section corresponding in shape to said lugs 35. The resulting reduced portion of the lower section is provided with plain apertures 37 which remain in alinement with the threaded apertures 36 when the two sections remain in an operative position. Screws 38 hold the two sections locked together.

A porcelain block 39 with its reduced portion 40 is positioned within the opening formed by the two sections and secured to lug 41 formed in each section by means of screws 42.

It is observed that the flanges 32 and 33 as well as the web 35 remain flush with the surface of the box when the two sections are assembled.

It is noted that the old boxes not made in sections as now in use make it necessary to bend the wire at an angle when it is pulled from the conduit pipe, owing to the fact that the adjusting sleeve and the porcelain block are in angular position in respect to each other. This is objectionable for the reason that the insulation rubs off the wire while it passes the point at the fitting. This objection is entirely eliminated in the invention herein described, owing to the fact that the upper section of the box is removed while the wire is being pulled upon, and thus there will be no interference with the proper extension of the wire as the same need not be then pulled when it remains bent, but will remain straight during the pulling operation.

What is claimed as new is:

1. A conduit outlet box comprising a pair of reversible sections formed with triangular end portions adapted to fit together on a line extending diagonally with respect to a cross section of the box, a triangular flange formed on each of the ends of one of the sections and the edges thereof representing the legs of the triangle contemplated thereby extending substantially at right angles to the respective sides of the section, and the other section formed with cut away portions in its end walls adapted to receive said flanges in interfitting engagement.

2. A conduit outlet box comprising a pair of reversible sections formed with triangular end portions adapted to fit together on a line diagonally positioned with respect to a cross section of the box, a flange formed on each of the ends of one of the sections and adapted to substantially conform to the shape of the ends of the other section, and said other section having cutaway portions in its ends adapted to receive said flanges in interfitting engagement.

3. A device of the type described comprising a pair of reversible sections adapted to fit together in either position to form an enclosure, the end portions of the sections being formed to meet on a line crossing the central portion of the ends of the enclosure, one of said sections provided with a flange on each of its ends shaped to substantially conform to the shape of the ends of the other section, the other section having cut away portions in its ends adapted to receive said flanges in interfitting engagement, and other flanges formed on said last named section adapted to be received in recesses in said first named section in either of the relative interlocking positions of said two sections.

In testimony whereof I affix my signature.

MICHAEL KIZYMA.